Patented May 12, 1936

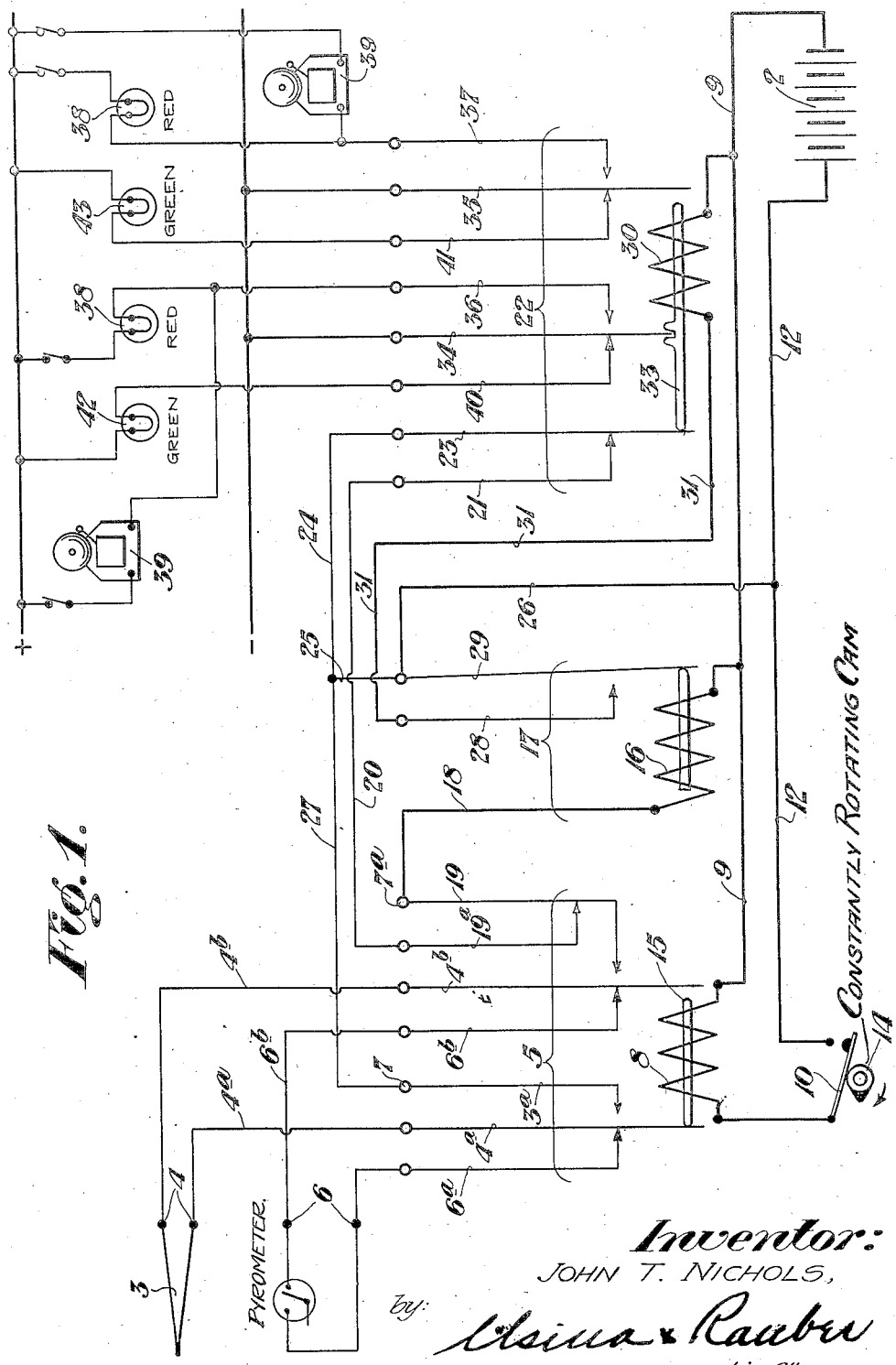

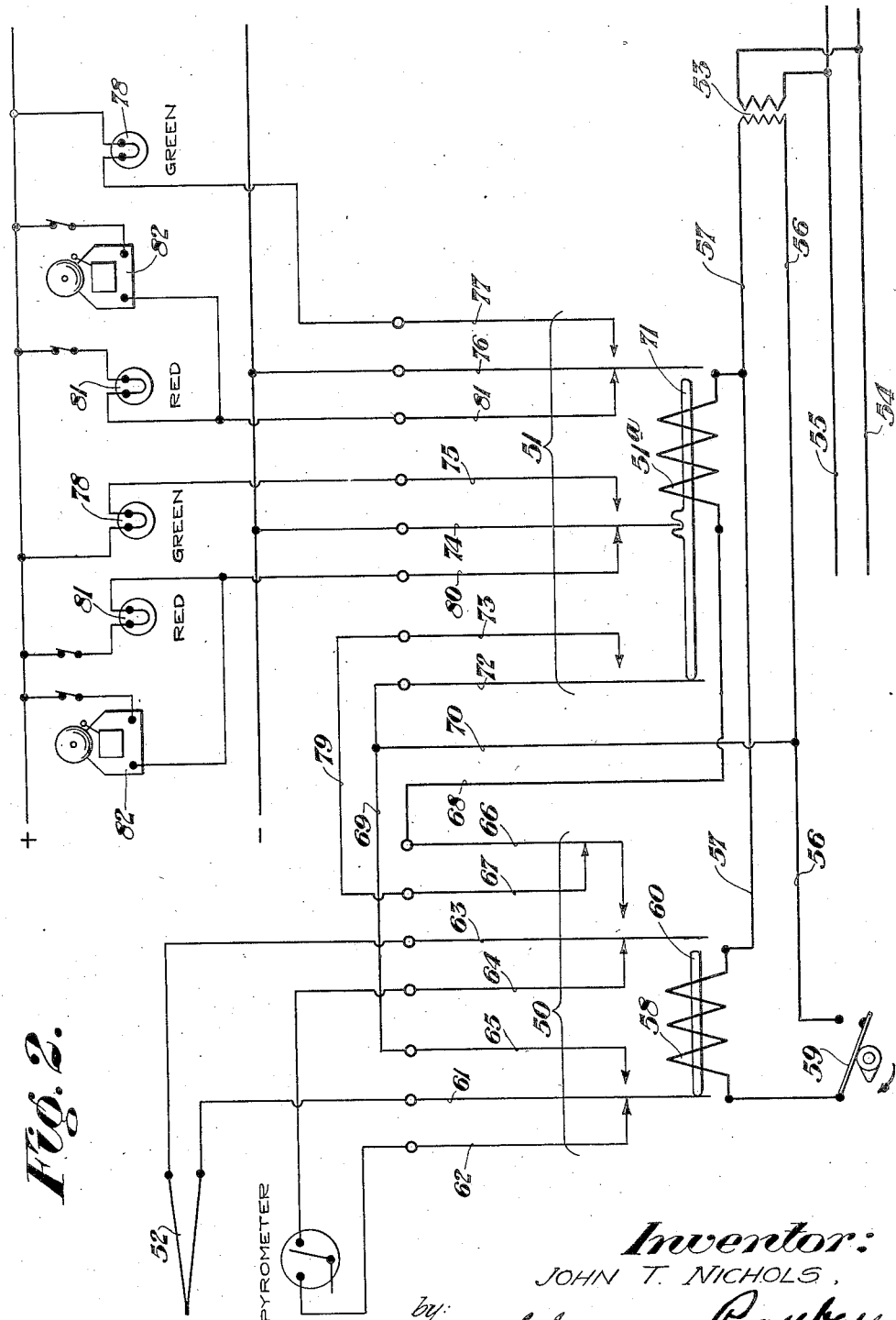

2,040,495

UNITED STATES PATENT OFFICE 2,040,495

THERMOCOUPLE TESTING APPARATUS

John T. Nichols, Pittsburgh, Pa.

Application July 1, 1931, Serial No. 548,238

5 Claims. (Cl. 177—311)

This invention relates to thermocouple testing apparatus and more particularly to means for giving either a visual or audible alarm when a thermocouple circuit is rendered incomplete due to a break or extremely high resistance.

Heretofore no means has been provided for notifying the operator of a break in a thermocouple circuit, therefore thermocouples have often been rendered inoperable with the result that valuable material or apparatus has been seriously damaged due to the failure of controls dependent upon the thermocouple circuit.

In the drawings, Figure 1 is a diagrammatic showing of one form of apparatus for carrying out this invention.

Figure 2 is a diagrammatic showing of a modified form of apparatus for carrying out the invention.

Referring more particularly to Figure 1, the numeral 2 designates a source of low voltage used for operating the testing and alarm apparatus which may be in the form of storage batteries or any other suitable source of constant low voltage. The numeral 3 designates a thermocouple which may be mounted in any suitable furnace or the like.

The thermocouple 3 is adapted to alternately have its terminals 4 connected through a relay operated mechanism 5 to contacts 6 of a pyrometer or other suitable temperature registering means (not shown), and to the terminals 7 of a control and testing circuit to be described.

The relay 5 has one end of its coil 8 connected to one side of the source of low voltage 2 by a wire 9, and has its other end connected to the other side of the source of low voltage through a make and break device 10 and wire 12. The make and break device 10 is a cam-operated contact adapted to be alternately closed and opened by a cam 14 continually while the apparatus is in operation. When the make and break device 10 is closed a circuit is completed through the wire 9, coil 8 of relay 5, make and break device 10 and wire 12, thereby energizing relay coil 8 and causing the core 15 of the relay to move from left to right, thus disconnecting the thermocouple 3 from the contacts 6 of the pyrometer, and connecting the terminals of said thermocouple to the terminals 7 and 7a of the alarm and testing circuit to be described.

A second relay 17 is provided which has its coil 16 normally energized by a circuit from the wire 9 through the coil 16, and through wire 18 to the terminal 7a and thence through fingers 19 and 19a of the relay 5 and wire 20 to a finger 21 of a third relay 22, which is normally deenergized. From the fingers 21 of relay 22 the circuit continues through the spring or finger 23 of the relay 22, through wires 24, 25 and 26, back to wire 12 and the other side of the source of current 2.

Immediately upon the operation of relay 5 the fingers or springs 4a and 4b of the relay 5 will move out of contact with fingers or springs 6a and 6b and into contact with fingers or springs 3a and 19, respectively, thereby disconnecting the thermocouple 3 from the pyrometer terminals 6 and breaking the contact between fingers 19 and 19a, so as to make a circuit as follows: from the wire 9 through the coil 16 of relay 17 through wire 18 and relay finger 19 to relay finger 4b, thence through the thermocouple 3 and back through the finger or spring 4a of relay 5 to the finger or spring 3a and then through wire 27 to wires 25 and 26 to the opposite side of the source of current 2.

From the above it will be noted that the coil 16 of relay 17 is constantly energized as long as the thermocouple 3 remains intact, regardless of whether the make and break device 10 is closed or open. As long as the coil 16 is energized finger or spring 29 will be held away from the spring or finger 28.

Now, assuming that the thermocouple circuit should become open, due to a break in the thermocouple or to extremely high resistance, which would prevent the circuit being completed through the thermocouple, or for any other reason, then when the make and break device 10 closes, the circuit to the coil 16 of relay 17 will be incomplete so that fingers or springs 28 and 29 of the relay 17 will move together and complete a circuit through the coil 30 of the relay 22. The circuit thus completed through the coil 30 will be from the wire 9 through the coil 30 through a wire 31 and finger or spring 28 to and through the spring or finger 29, thence through wire 26 back to wire 12 and the other side of the source of current 2. The energization of coil 30 of relay 22 will cause its core 33 to move from the left to right, thereby moving its fingers or springs 23, 34 and 35 from left to right, so as to cause the fingers 34 and 35 to contact with springs or fingers 36 and 37, respectively, which will complete alarm circuits to the visible and audible alarms shown as red lights and bells 38 and 39, respectively.

When the relay 22 is deenergized the fingers or springs 34 and 35 will be in engagement with fingers or springs 40 and 41, respectively, so as to complete circuits to visible signals in the form of green lights 42 and 43, respectively.

It will be understood, of course, that any other form of visible or audible form of alarm other than the lights and bells shown and any combination of such signals may be used.

It will also be understood that circuits made and broken by the springs 34 and/or 35 may be used to operate valves or other control mechanisms (not shown) when desired.

Referring more particularly to Figure 2, the apparatus therein shown consists of only two relays, which are designated by the numerals 50 and 51, respectively, and the thermocouple is designated by the numeral 52.

The apparatus of the figure is adapted to be operated from the usual power lines carrying 110 or other normal voltage, and, therefore, in order to provide a constant voltage for the testing and alarm circuits a transformer 53 is provided between power lines 54 and 55 and supply lines 56 and 57 of the system.

The relay 50 is adapted to have its coil 58 alternately energized and deenergized by a constantly operating make and break device 59. When the make and break device 59 is closed a circuit is made from the wire 57 through the coil 58 and through the make and break device 59 to the wire 56. Energization of the coil 58 of relay 50 will cause the core 60 of the relay 50 to move from left to right so as to break the connection between the relay springs or fingers 61 and 62 and 63 and 64, respectively, and make contact between the fingers or springs 61 and 65, and 63 and 66, respectively. As contact is made between the fingers or springs 63 and 66, a contact is broken between the spring or finger 66 and a spring or finger 67.

When the contact is made between the fingers 61 and 65 and 63 and 66, a circuit will be completed from the wire 57 through a coil 51ᵃ of relay 51 through a wire 68, thence through the fingers 66 and 63 and through thermocouple 52 and back through the fingers 61 and 65 to wires 69 and 70 to the wire 56 and to the other side of the line. Completion of the circuit through the coil 51ᵃ will energize the coil and cause the core 71 of the relay 51 to move from left to right, thus making contact between fingers 72 and 73, 74 and 75, 76 and 77, respectively, of the relay 51. The contacting of the fingers 74 and 75, 76 and 77 will complete circuits through visible signal lights 78. The engagement of the fingers 72 and 73 will complete a circuit from the wire 57 through the coil 51ᵃ through the wire 68 and fingers 66 and 67 (when relay 50 is deenergized), thence through a wire 79 and fingers 72 and 73 to the wires 70 and 56 and to the other side of the line.

From the above it will be noted that if the coil 51ᵃ is once energized it will remain energized, regardless of whether the make and break device 59 is open or closed, as long as the circuit through the thermocouple 52 is complete, and therefore the green signal lights will remain lighted as long as the thermocouple circuit is complete.

If for any reason, such as a break in the thermocouple or high resistance, the circuit should be incomplete through the thermocouple 52, the coil 51ᵃ will be deenergized when the make and break device 59 is closed to energize the relay 50 so as to make the circuit through the thermocouple 52.

Immediately upon deenergization of the coil 51ᵃ of the relay 51 the core 71 will move from right to left, and the fingers or springs 74 and 76 will contact with fingers 80 and 81, respectively, so as to complete alarm circuits through visible and audible alarms shown as red lights 81 and bells 82, respectively, thereby notifying the operator of a break in the thermocouple circuit.

It will be understood that the circuits made and broken by the fingers or springs 74 and 76 may also be used to operate valves or other control mechanisms (not shown) when desired or necessary.

While I have shown and described certain specific embodiments of my invention, it will be understood that I do not wish to be limited to the details thereof, since various modifications and changes may be made and will readily suggest themselves to those skilled in the art when adapting this invention to the various uses to which it may be put, without departing from the scope of my invention, as defined in the appended claims.

I claim:

1. The combination of a device that conducts electricity when in operative condition, a circuit for said device, a normally closed test circuit, means for periodically disconnecting said device from the first named circuit and connecting it in said test circuit so that the latter remains closed while so doing, circuit making-and-breaking contacts and means controlled by said test circuit for operating said contacts.

2. The combination of a device that conducts electricity when in operative condition, a circuit for said device, a normally closed first circuit including a first relay, a switch device held open by said first relay when the latter is energized and adapted to close when the latter is deenergized, a second circuit including a second relay, means for periodically energizing said second relay, a third circuit including said first relay, and means including said second relay for disconnecting said device from its circuit and connecting it in said third circuit and for opening said first circuit shortly thereafter.

3. The combination of a thermocouple, a pyrometer, a circuit for interconnecting said thermocouple and said pyrometer, a relay including an operating coil, a source of electric energy, a circuit for connecting said thermocouple and said coil in series with said source, a circuit for connecting said coil in series with said source, circuit making-and-breaking contacts for each of said circuits, and means for operating said contacts so that the first and second named circuits are respectively broken and made and so that the third named circuit is subsequently broken.

4. The combination of a thermocouple, a pyrometer, a circuit for interconnecting said thermocouple and said pyrometer, a relay including an operating coil, a source of electric energy, a circuit for connecting said thermocouple and said coil in series with said source, a circuit for connecting said coil in series with said source, circuit making-and-breaking contacts for each of said circuits, and means for simultaneously opening and closing said contacts for the first and second named circuits respectively and for subsequently opening said contacts for the third named circuit.

5. The combination of a thermocouple, a pyrometer, a circuit for interconnecting said thermocouple and said pyrometer, a relay including an operating coil, a source of electric energy, a circuit for connecting said thermocouple and said coil in series with said source, a circuit for connecting said coil in series with said source, circuit making-and-breaking contacts for each of said circuits, and means for periodically opening and closing said contacts for the first named circuit while closing and opening said contacts for the second named circuit simultaneously therewith and for periodically opening and closing said contacts for the third named circuit respectively subsequently and previously to said opening and closing of the second named contacts.

JOHN T. NICHOLS.